United States Patent Office 3,267,011
Patented August 16, 1966

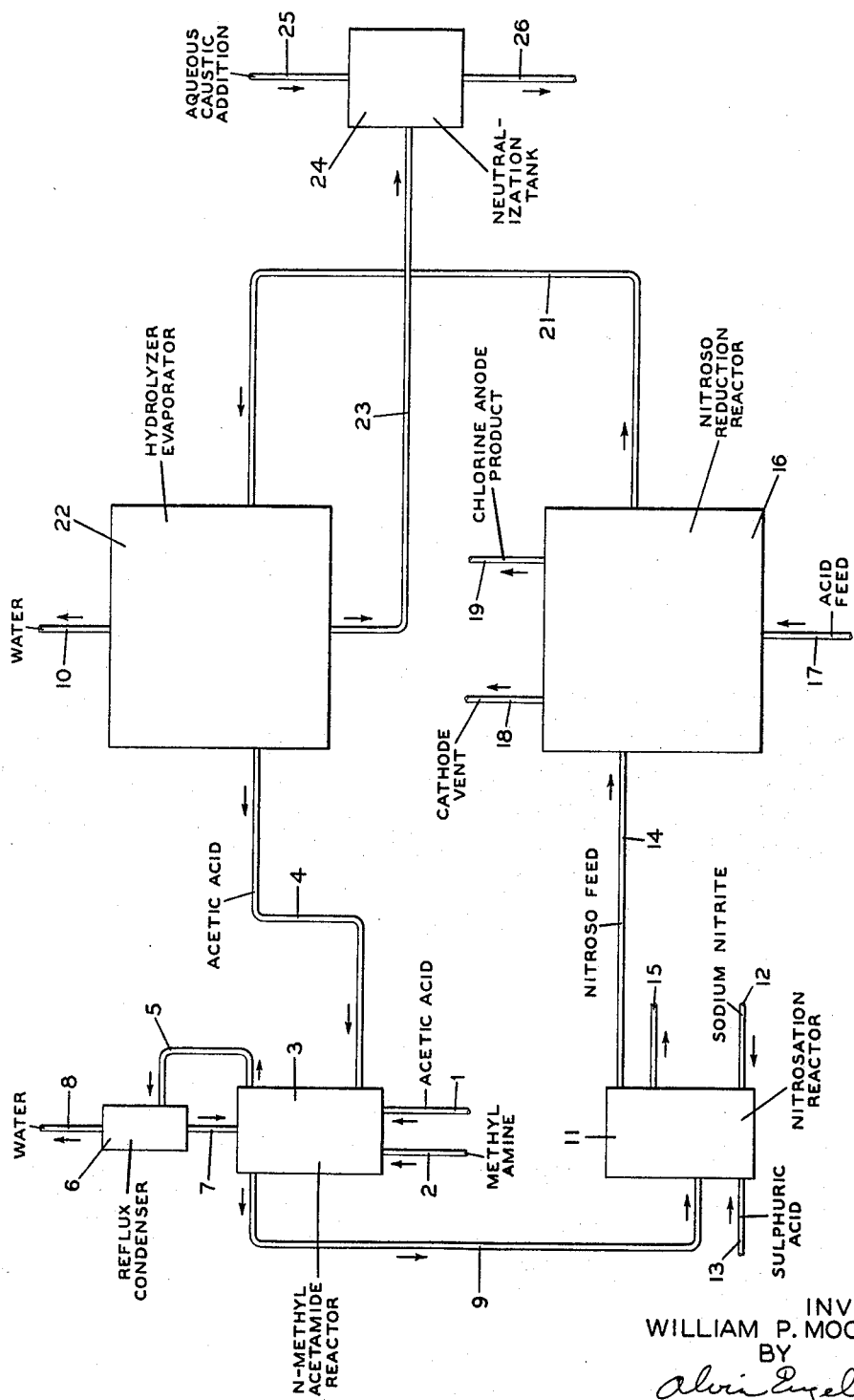

---

3,267,011
MONOALKYLHYDRAZINE SYNTHESIS
William Percy Moore, Jr., Chester, Va., assignor to Allied
  Chemical Corporation, New York, N.Y., a corporation
  of New York
Filed Feb. 5, 1962, Ser. No. 171,128
10 Claims. (Cl. 204—74)

This invention relates to monoalkylhydrazine and more particularly to a new and improved process for preparing monomethylhydrazine.

Monomethylhydrazine, a known compound useful for rocket propulsion, has been prepared by various methods such as by the methylation of hydrazine; by the aminolysis of hydroxylamine-O-sulfonic acid; by a modification of the well known Raschig-type synthesis; and by the reduction of methyl nitrosyl ureas. These conventional procedures for producing monomethylhydrazine unfortunately are not entirely satisfactory particularly for large scale commercial production. More specifically, intermediate products which are formed are either lost or consumed in the reaction, yields are poor, and chemicals are needed to produce nascent hydrogen for the reduction which not only adds to the cost but also complicates the separation of the desired product because of increased by-product formation.

An object of the invention is to provide a process for preparing monomethylhydrazine, which process is efficient particularly in that it results in the economic production of good yields of manomethylhydrazine.

It is another object to provide a process for preparing monomethylhydrazine which process does not consume intermediates and does not require chemicals to produce nascent hydrogen for the reduction phase.

Other objects and advantages will be apparent from the following detailed description and accompanying drawing.

In accordance with the present invention monomethylhydrazine may be prepared in an efficient and economical manner with yields of about 70%, by reacting glacial acetic acid and anhydrous monomethylamine to form N-methylacetamide, nitrosating said N-methylacetamide by reaction with a metal nitrite such as sodium or potassium nitrite in aqueous acid solution, separating N-nitroso-N-methylacetamide from the formed aqueous by-product, feeding said N-nitroso-N-methylacetamide into an electrolytic reduction reactor containing an aqueous fresh acid solution, preferably at a rate of feed being equivalent to the amount of current flowing to the cathode, maintaining a low concentration of unreacted nitroso in solution, below 0.5% or less by weight, preferably below 0.1% by weight, maintaining the reactor retention time of unreacted N-nitroso-N-methylacetamide below about 5 minutes, preferably below one minute, to effectively convert N-nitroso-N-methylacetamide to N-methylacetylhydrazide at a temperature in the range of 4° to 10° C., preferably 6° to 10° C.; hydrolyzing the N-methylacetylhydrazide by either acid or base hydrolysis preferably acid hydrolysis, and thereafter recovering the methylhydrazine free base by treating the salt which is formed with a strong base solution and then recovering the methylhydrazine as by distillation.

A feature of the present invention is based on the discovery that N-nitroso-N-methylacetamide subjected to electrolytic reduction under controlled conditions produces N-methylacetylhydrazide with yields of about 70% or higher based on the nitroso compound fed. The resulting N-methylacetylhydrazide can then be readily hydrolyzed to produce monomethylhydrazine.

The reactions which take place may be exemplified by the equations:

(a) AMIDE SYNTHESIS

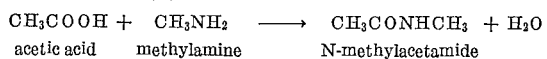

(b) NITROSATION

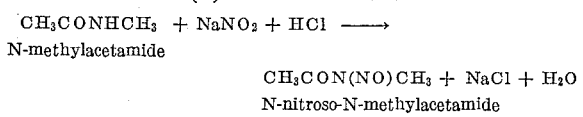

(c) REDUCTION

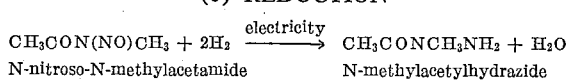

(d) HYDROLYSIS

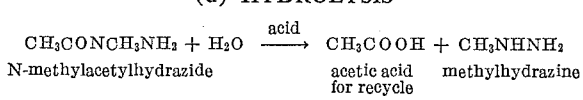

A convenient method of preparing N-methylacetamide is by the conventional reaction of acetic acid and methylamine at an elevated temperature above about 120° C., preferably within the range of 140°–160° C.

In the amide synthesis, the raw materials, methylamine and glacial acetic acid are heated in a vessel desirably equipped with a reflux condenser which serves to condense acetic acid and the condensate returned to the reaction vessel. N-methylacetamide and water are formed as products and all or a substantial portion of the water may be removed by any convenient method, e.g. by simple distillation leaving N-methylacetamide with small amounts of water which may then be advanced to a nitrosation reactor for the second stage of the process. The N-methylacetamide is reacted with a nitrite such as sodium nitrite in aqueous acid solution such as sulfuric acid or hydrochloric acid. Aqueous sodium sulfate or sodium chloride is formed as a by-product and the water insoluble N-nitroso-N-methylacetamide product separated from aqueous sodium sulfate by decanting, where it can then be advanced to the electrolytic reduction phase without further purification.

N-nitroso-N-methylacetamide is normally very unstable decomposing primarily to nitrogen and methylacetate with little or no desired N-methylacetylhydrazide being obtained if the usual procedure of electrolysis is used. For successful practice of the invention, it is important that the N-nitroso-N-methylacetamide in solution during electrolysis be prevented from rapidly decomposing so that conversion to N-methylacetylhydrazide can be accomplished to provide good yields of monomethylhydrazine. Best results for converting N-nitroso-N-methylacetamide by electrolysis to N-methylacetylhydrazide are obtained by employing a combination of factors. The feed of N-nitroso-N-methylacetamide to the aqueous acid solution in the cell is advantageously at a rate about equivalent to the amount of current flowing to the cathode. The retention time of unreacted N-nitroso-N-methylacetamide in the cell should be below about 5 minutes and preferably below 1 minute. According to Faraday's law 96,500 ampere-seconds of current will reduce one-gram equivalent weight at the cathode. Consequently, the rate of feed of N-nitroso-N-methylacetamide can be regulated with the current flowing to the cathode so that concentrations of unreacted nitroso in the cathode section are maintained at about 0.5% or less by weight and preferably below 0.1%. Concentrations of unreacted N-nitroso-N-methylacetamide in excess of 0.5% causes a reduction of reaction efficiency due to the decomposition of N-nitroso-N-methylacetamide in solution and are therefore not desirable. On the other hand current densities on the electrode may be varied over a wide range as for example, from about 0.01 to 2.0 amperes per cm.$^2$ without affecting yields, provided however, the heat generated during the reaction is dissipated. Optimum results are obtainable however when current densities in the order of about 0.01 to 0.30 amperes/cm.$^2$ are used although the optimum current density may vary somewhat depending on the particular concentration of N-nitroso-N-methylacetamide in solution. To maintain the reactor retention time of unreacted N-nitroso-N-methylacetamide in solution within the time ranges indicated the space velocities i.e. the volume of catholyte divided by the volume of catholyte chamber multiplied by the number of hours in the cathode chamber are kept in the order of about 0.6 hr.$^{-1}$ or higher and the reactor should be properly sized to accomplish this.

Another condition which affects the yield of N-methylacetylhydrazide is the temperature at which the reaction takes place. I have found that use of temperatures materially in excess of about 10° C. causes rapid decomposition of N-nitroso-N-methylacetamide whereas temperatures below 4° C. causes this compound to solidify. When the temperature was maintained between 4°–10° C. satisfactory conversion of N-nitroso-N-methylacetamide to N-methylacetylhydrazide resulted with optimum results obtained by using a temperature in the range of 6°–10° C.

Procedurally, the electrolytic reduction process may be performed in a fresh acid solution preferably a fresh mineral acid solution. Neutral solutions however, are not suitable since they render the process inoperable. Hydrochloric and sulfuric acid have been found particularly suitable for the operation because of their low cost, low cell resistance, and excellent performance in the process. When aqueous hydrochloric acid is used, high purity chlorine is produced at the anode as a valuable by-product. Oxygen is produced at the anode when aqueous sulfuric acid is the electrolyte. Other highly ionized acids which allow the operation of the cell with a low resistance may be employed in the process such as aqueous nitric acid or phosphoric acid but are not as satisfactory as sulfuric or hydrochloric acid. An acid concentration of about 5–20% gave good results in practice. Water is the preferred electrolyte solvent and in operation at least one equivalent of acid is added to the electrolyte per mol of nitroso methylacetamide fed to the cell.

In the electrolytic reduction reactor, the composition, shape and area of the electrodes are not critical; however, best results are obtained when the cathode is made of copper, silver or lead and the anode is of carbon when aqueous hydrochloric acid is the electrolyte, or lead when aqueous sulfuric acid is used. The reduction of N-nitroso-N-methylacetamide occurs at the cathode and for best results it is desired that the catholyte and anolyte be separated since little or no hydrazide product is produced if there is a diffusion of components between the anolytic and catholytic compartments. A diaphragm is a suitable separating medium and it may be constructed of any porous material which allows the passage of the reacting ions but does not allow the general mixing of the anolyte and the catholyte. Cellophane, asbestos cloth, glass cloth, porous polyvinylchloride sheet and porous alundum sheets are suitable diaphragms, the preferred type being diaphragms of porous polyvinylchloride sheets. The conditions of operation are such that pressures in the range of 10–100 p.s.i.a. are suitable.

As a result of electrolysis the N-nitroso-N-methylacetamide is reduced to N-methylacetylhydrazide which is withdrawn from the electrolytic cell in the form of an aqueous mixture containing N-methylacetylhydrazide and mineral acid such as hydrochloric acid or sulfuric acid. The N-methylacetylhydrazide may be converted to methylhydrazine by hydrolysis which may be accomplished by heating the aqueous mixture in the presence of an acid. Since a mineral acid is already present in the aqueous mixture it is generally unnecessary to add any additional acid and all that is required is the simple heating of the aqueous mixture preferably at a sufficiently high temperature of the order of about 80–120° C. to evaporate water and acetic acid which latter may be returned to the N-methylacetamide reactor for further reaction with methylamine to produce N-methylacetamide. Since mineral acid such as hydrochloric or sulfuric acid is present in the hydrolyzer evaporator the methylhydrazine will form an acid salt e.g. methylhydrazine hydrochloride which is withdrawn. The methylhydrazine may be liberated from the salt by neutralization with any alkaline material such as caustic soda and the methylhydrazine recovered from the neutralized solution by conventional distillation.

The accompanying drawing diagrammatically illustrates a preferred method of practicing the process of the invention.

Acetic acid entering through line 1 and methylamine entering through line 2 are introduced into a reaction vessel 3 together with recycled acetic acid entering through line 4. Reaction vessel 3 is equipped with reflux condenser 6 which may be of any suitable type wherein vapors of acetic acid are cooled and condensed by indirect heat exchange with a cooling medium such as water and may be of the single or multipass, vertical or horizontal tube type.

The reaction temperature is generally maintained at about 140–160° C. and the pressure is substantially atmospheric although higher or lower pressures may be employed. Under the reaction conditions, acetic acid and water vaporizes passing through line 5 to reflux condenser 6 where the vapors are cooled and condensed at a temperature below 100° C. and the liquid condensate returned to the reactor through line 7. After completion of reaction, the cooling in the reflux condenser is discontinued and the temperature in reflux condenser 6 increased to about 100° C. or higher to permit the distillation of water through line 8 formed as a product of the reaction.

N-methylacetamide produced in reactor 3 passes through line 9 to nitrosation reactor 11 which is also equipped with provisions for continuous introduction of sodium nitrite entering the lower portion of the reactor through line 12 and sulfuric acid entering through line 13. The water insoluble N-nitroso-N-methylacetamide which is formed rises to the top of reactor 11 where it is decanted from the aqueous $Na_2SO_4$ by-product discharging through line 14, and introduced to the cathode side of nitroso reduction reactor 16, with the $Na_2SO_4$ leaving the upper portion of the vessel through line 15. Fresh mineral acid is added to the cathode section of reactor 16 through line 17 with water being added to the anode section. The reactor 16 is of the type which employs a bank of cells, preferably four in number which operate in series, each cell having a voltage drop of 2.8–3.2 volts with the flow of cathode and anode products being forwarded from one bank of cells to the next. Each bank contains about 150 cells whose bodies are constructed of phenolic impregnated asbestos. Heat generated during the reaction is effectively controlled by circulating the liquid contents of each bank of cells through an external cooler not shown, to maintain the reaction temperature between 6°–10° C., preferably 4°–10° C. Each cell has a thickness of one inch with ½ inch anode and ½ inch cathode compartments which are preferably separated by a diaphragm preventing mixing of the anolyte and catholyte.

Small amounts of excess hydrogen which is formed are vented from the cathode compartment through line 18 and the by-products chlorine or oxygen are recovered from the anode compartments through line 19. The reduced product N-methylacetylhydrazide flows in the aqueous acid solution, through line 21 to a hydrolyzer evaporator 22 where most of the N-methylacetylhydrazide is hydrolyzed upon the application of heat. Excess water is evaporated and discharged through line 10 and acetic acid formed in the hydrolysis stage sent through line 4 and returned to the process if desired. The anolyte may be either recycled or discarded.

The methylhydrazine is recovered as a salt and sent to neutralization tank 24 through line 23 where it is neutralized with aqueous caustic solution entering through line 25. The methylhydrazine free base which is formed is discharged through line 26 where a simple distillation procedure, not shown, produces substantially pure methylhydrazine. The following examples are given to illustrate preferred modes of practicing the process of the present invention.

EXAMPLE 1

This example demonstrates a process for the production of monomethylhydrazine via N-nitroso-N-methylacetamide and N-methylacetamide and intermediate N-methylacetylhydrazide with chlorine as a by-product.

31.0 grams anhydrous monomethylamine and 60.1 grams glacial acetic acid were mixed and heated to 150° C. for 2 hours in a 250 ml. round bottom flask, fitted with reflux condenser. After the 2 hour reaction period, the reflux condenser was replaced with a 1″ diameter Vigreux column 12″ high and the water was distilled overhead. The N-methylacetamide was then taken overhead and sent to the nitrosation reaction. 91.0 grams of product, consisting of 80.2% N-methylacetamide and 19.8% water, was advanced to the nitrosation reactor in a 1 hour period.

The nitrosation reactor consisted of a 1″ diameter glass tube 36″ high, in a vertical position, fitted with opening at the top for decanting and in the bottom for continuous induction of sodium nitrite (104.0 grams/hr. in aqueous solution) and sulfuric acid (73.9 grams/hr.), and the N-methylacetamide. A side stream opening was located 24″ up from the bottom of the reactor. The water insoluble N-nitroso-N-methylacetamide rose quickly to the top of the reactor as it was formed and was decanted from the aqueous $Na_2SO_4$ by-product, which was continuously removed through the side stream opening. 91.4 grams N-nitroso-N-methylacetamide (98.9% pure) was decanted in a one-hour period and sent directly to the hydrogenation system with no purification required where it was continuously fed to the cathode side of a bank of electrolytic cells, containing 680.0 grams aqueous hydrochloric acid (26.5% wt.). The anolyte was also composed of 26.5% aqueous hydrochloric acid. The anolytes and catholytes were separated by 1/8″ porous polyvinylchloride cloth diaphragms in each cell and were circulated through separate refrigeration units to maintain reaction temperature at 6°–10° C. The reactor pressure was atmospheric. Current density on the cathode and anode was 0.10 amp per cm.$^2$. Cathodes consisted of flat sheets of copper and the anodes were flat sheets of graphite. During the one-hour period the current flow was held just slightly in excess of that required to reduce the nitroso compound to the hydrazide, according to Faraday's law, and was 103.5 amperes with 3.0 volts drop per cell. Concentration of the nitroso compound in the cathode was less than 0.10% (wt.) based on the total solution in the cathode throughout the test period.

During the one-hour test period, 0.58 gram hydrogen and 3.72 grams of nitrogen were vented from the cathode side of the cell bank and 137 grams of chlorine were continuously produced and recovered from the anode. A large portion of the intermediate N-methylacetylhydrazide was hydrolyzed to the desired methylhydrazine product during the one-hour test period but some hydrazide was present in the 630 grams of aqueous solution removed as cathode product. Mean retention time of unreacted N-nitroso-N-methylacetamide in the cathode was 0.2 minute. The cathode product had the following composition:

Composition

| Component: | Weight percent |
|---|---|
| Methylhydrazine hydrochloride | 4.87 |
| N-methylacetylhydrazide | 3.51 |
| Acetic acid | 6.05 |
| Methylamine hydrochloride | 1.42 |
| Ammonium chloride | 1.13 |
| Hydrochloric acid | 2.53 |
| Methanol | 0.67 |
| N-nitroso-N-methylacetamide | 0.05 |
| Water (by difference) | 79.77 |

Evaporation of the catholyte completed the hydrolysis of the N-methylacetylhydrazide to methylhydrazine hydrochloride and gave acetic acid and hydrochloric acid for recycle. The bottoms from the evaporation amounting to 71.3 grams, was a melt with the following composition:

Composition

| Component: | Weight percent |
|---|---|
| Methylhydrazine hydrochloride | 71.82 |
| Methylamine hydrochloride | 12.59 |
| Ammonium chloride | 9.98 |
| Hydrochloric acid | 1.40 |
| Water (by difference) | 4.21 |

To this material 190 grams of aqueous caustic, containing 21.1% (wt.) NaOH, was added to produce 261 grams of impure aqueous methylhydrazine solution with the following composition:

Composition

| Component: | Weight percent |
|---|---|
| Methylhydrazine | 10.92 |
| Methylamine | 1.58 |
| Ammonia | 0.86 |
| Sodium chloride | 20.44 |
| Sodium hydroxide | 1.40 |
| Water (by difference) | 64.80 |

The above product was distilled to remove the more volatile constituents (methylamine, ammonia and some water). Methylhydrazine was then recovered in pure form by extractive distillation with aqueous caustic. 28.5 grams of product, containing 99.3% methylhydrazine, were obtained. The overall recovery of methylhydrazine from N-nitroso-N-methylacetamide was 69.4% on a single-pass basis.

EXAMPLE 2

This example demonstrates the electrolytic reduction method for converting N-nitroso-N-methylacetamide to methylhydrazine with oxygen as a valuable by-product. Aqueous sulfuric acid is the electrolyte.

Throughout a one-hour test period, 259 amperes of current were passed through a bank of electrolytic cells with copper cathodes and lead anodes separated by diaphragms of cellophane. The electrolyte in both the cathode and anode chamber was aqueous sulfuric acid (12.6% wt.). 1715 grams (1590 ml.) of the acid was continuously fed to the cathode side of the cell bank. The total volume of the cathode chambers was 1200 ml. N-nitroso-N-methylacetamide was also continuously fed to the catholyte throughout the test period at a rate which was just under that which would be reduced by the 259 amperes, with 226.0 grams (207 ml.) added continuously throughout the one-hour test period. The space velocity in the cathode was 1.5 hr.$^{-1}$. Voltage drop per cell was 2.9 volts and the reactor temperature was held at 6°–10° C. at atmospheric pressure. Catholyte overflow collected amounting to 1858 grams was obtained during the test period, along with 9.30 grams of nitrogen and 1.40 grams hydrogen, vented at the cathode. Oxygen by-product made at the anode amounted to 77.20 grams. Mean retention time of the unreacted N-nitroso-N-methylacetamide was 0.1 minute. The liquid catholyte had the following composition:

*Composition*

| Component: | Weight percent |
|---|---|
| Methylhydrazine sulfate | 10.01 |
| N-methylacetylhydrazide | 1.24 |
| Methylamine sulfate | 1.43 |
| Methylsulfuric acid | 2.00 |
| Ammonium sulfate | 1.18 |
| Sulfuric acid | 1.37 |
| Acetic acid | 6.30 |
| N-nitroso-N-methylacetamide | 0.02 |
| Water (by difference) | 76.45 |

To this material was added 445 grams of aqueous caustic containing 43.8% (wt.) NaOH which produced 829 grams of product with the following composition:

*Composition*

| Component: | Weight percent |
|---|---|
| Methylhydrazine | 8.61 |
| Methylamine | 1.24 |
| Ammonia | 0.68 |
| Methanol | 1.28 |
| Sodium sulfate | 37.95 |
| Sodium hydroxide | 2.14 |
| Water (by difference) | 48.10 |

The above product was distilled to remove the more volatile constituents (methanol, methylamine and ammonia). Methylhydrazine was recovered in pure form by extractive distillation with aqueous caustic. 71.0 grams of product, containing 99.3% methylhydrazine, were obtained. The overall recovery of methylhydrazine from N-nitroso-N-methylacetamide was 69.1% on a single-pass basis.

It will be noted that the present invention provides a continuous process for preparing monomethylhydrazine which process is free of disadvantages of the prior art particularly in that no intermediates are consumed, i.e., the process does not consume the acetic acid used to produce the intermediate substituted acetamides and no chemicals are required to produce nascent hydrogen for the reduction.

Since certain changes may be made in carrying out the above described process, it is intended that all matter contained in the above description and shown in the accompanying drawing shall be interpreted as illustrative and not in a limiting sense.

Similarly, other lower monoalkylhydrazine compounds e.g. ethyl, propyl and butyl hydrazine may be produced by reducing N-nitroso-N-monoalkylacylamides to the corresponding N-monoalkylacylhydrazides and hydrolyzing the N-monoalkylacylhydrazides to monoalkylhydrazines.

I claim:

1. A process for the production of monalkylhydrazine which comprises reacting acetic acid and alkylamine to form N-alkylacetamide, nitrosating said N-alkylacetamide by reaction with a nitrite to form N-nitroso-N-alkylacetamide, electrolytically reducing said N-nitroso-N-alkylacetamide in a mineral acid solution at a temperature of about 4° C. to 10° C. and a current density of about 0.01 to about 2.0 amperes per cm.$^2$, adding said N - nitroso - N - alkylacetamide to the mineral acid solution at a rate about equivalent to the amount of current flowing to the cathode, maintaining a concentration of unreacted nitroso in solution below about 0.5% by weight to produce N - alkylacetylhydrazide, hydrolyzing said N - alkylacetylhydrazide, to form acetic acid and monoalkylhydrazine and returning said acetic acid for further reaction with alkylamine to form N-alkylacetamide.

2. A process for the production of monomethylhydrazine which comprises reacting acetic acid and methylamine to form N - methylacetamide, nitrosating said N - methylacetamide by reaction with a nitrite to form N - nitroso - N - methylacetamide, electrolytically reducing said N - nitroso- N - methylacetamide in a mineral acid solution at a temperature of about 4° C. to 10° C. and a current density of about 0.01 to about 2.0 amperes per cm.$^2$, adding said N - nitroso - N - methylacetamide to the mineral acid solution at a rate about equivalent to the amount of current flowing to the cathode, maintaining a concentration of unreacted nitroso in solution below about 0.5% by weight to produce N - methylacetylhydrazide, hydrolyzing said N- methylacetylhydrazide to form acetic acid and monomethylhydrazine and returning said acetic acid for further reaction with methylamine to form N-methylacetamide.

3. A process for producing N - alkylacetylhydrazide which comprises electrolytically reducing N - nitroso-N - alkylacetamide in an aqueous mineral acid solution at a temperature of about 4° C. to 10° C. and a current density of about 0.01 to about 2.0 amperes per cm.$^2$, adding said N - nitroso - N - alkylacetamide to the mineral acid solution at a rate about equivalent to the amount of current flowing to the cathode, and maintaining a concentration of unreacted nitroso in solution below about 0.5% by weight to produce N-alkylacetylhydrazide.

4. The process of claim 3 wherein space velocities on the order of 0.6$^{-1}$ or higher are maintained in the electrolytic cell.

5. The process of claim 3 wherein at least one equivalent of acid is added to the electrolyte per mol of N-nitroso-N-alkylacetamide fed to the cell.

6. A process for producing N - methylacetylhydrazide and oxygen which comprises electrolytically reducing N-nitroso-N-methylacetamide in an aqueous sulfuric acid solution at a temperature of about 4° C. to 10° C. and a current density of about 0.01 to about 2.0 amperes per cm.$^2$, adding said N - nitroso - N - methylacetamide to the aqueous sulfuric acid solution at a rate about equivalent to the amount of current flowing to the cathode, and maintaining a concentration of unreacted nitroso in solution below about 0.5% by weight to convert N - nitroso - N - methylacetamide to N - methylacetylhydrazide while simultaneously producing oxygen at the anode.

7. A process for producing N - methylacetylhydrazide and chlorine which comprises electrolytically reducing N-nitroso - N - methylacetamide in an aqueous hydrochloric acid solution at a temperature of about 4° C. to 10° C. and a current density of about 0.01 to about 2.0 amperes per cm.$^2$, adding said N - nitroso - N - methylacetamide to the aqueous hydrochloric acid solution at a rate about equivalent to the amount of current flowing to the cathode, and maintaining a concentration of unreacted nitroso in solution below about 0.5% by weight to convert N - nitroso - N - methylacetamide to N-methylacetylhydrazide while simultaneously producing chlorine at the anode.

8. A process for producing N - methylacetylhydrazide which comprises electrolytically reducing N - nitroso-N - methylacetamide in a mineral acid solution at a temperature of about 4° to 10° C. and a current density of about 0.01 to about 2.0 amperes per cm.$^2$, adding N-nitroso - N - methylacetamide to the mineral acid solution at a rate about equivalent to the amount of current flowing to the cathode, adding at least one equivalent of mineral acid per mol of N - nitroso - N - methylacetamide fed to the cell, maintaining space velocities on the order of 0.6$^{-1}$ or higher in the electrolytic cell, maintaining a concentration of unreacted nitroso in solution below about 0.5% by weight, and withdrawing N - methylacetylhydrazide produced by electrolytic reduction of N - nitroso - N - methylacetamide.

9. A process for producing N - methylacetylhydrazide which comprises feeding N - nitroso - N - methylacetamide to an electrolytic cell containing an aqueous sulfuric acid solution at a rate about equivalent to the amount of current flowing to the cathode, maintaining a current density on the order of about 0.01 to 0.30 amperes per cm.$^2$, maintaining a concentration of unreacted N - nitroso - N - methylacetamide in solution below 0.1% and maintaining the temperature in the range of 6° to 10° C. to convert N - nitroso - N - methylacetamide to N - methylacetylhydrazide.

10. A process for producing monomethylhydrazine which comprises electrolytically reducing N - nitroso-N - methylacetamide in an aqueous mineral acid solution in a mineral acid solution at a temperature of about 4° C. to 10° C. and a current density of about 0.01 to about 2.0 amperes per cm.$^2$, adding said N - nitroso-N - methylacetamide to the mineral acid solution at a rate about equivalent to the amount of current flowing to the cathode, maintaining a concentration of unreacted nitroso in solution below about 0.5% by weight to form N-methylacetylhydrazide, and hydrolyzing said N-methylacetylhydrazide to form said monomethylhydrazine.

References Cited by the Examiner
UNITED STATES PATENTS

| | | | |
|---|---|---|---|
| 2,427,433 | 9/1947 | Winslow et al. | 204—74 |
| 2,852,451 | 9/1958 | Gever | 204—74 |
| 2,916,426 | 12/1959 | Horvitz et al. | 204—74 |
| 2,918,418 | 12/1959 | Madaus et al. | 204—74 |
| 2,978,508 | 4/1961 | Frankel et al. | 260—583 |
| 2,978,509 | 4/1961 | Frankel | 260—583 |

JOHN H. MACK, *Primary Examiner.*

JOHN R. SPECK, MURRAY TILLMAN, WINSTON A. DOUGLAS, *Examiners.*

G. KAPLAN, H. FLOURNOY, *Assistant Examiners.*